Sept. 25, 1923.  W. DOLL  1,468,776
AIR HOSE CABINET
Filed April 13, 1922
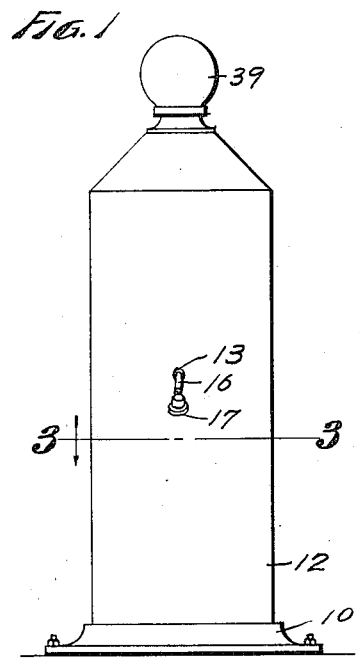
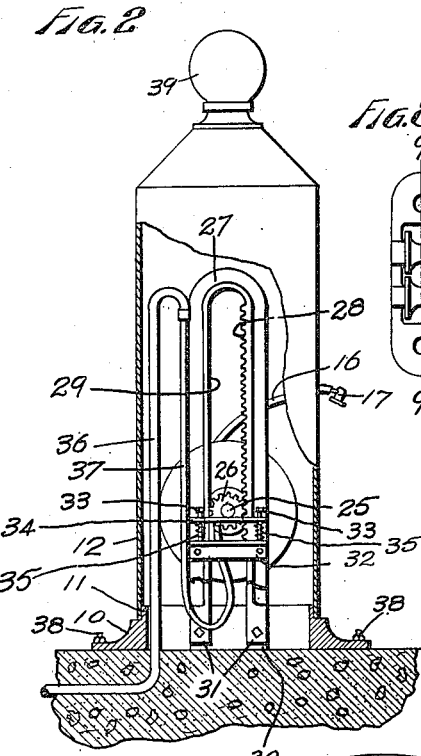
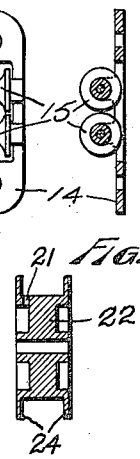
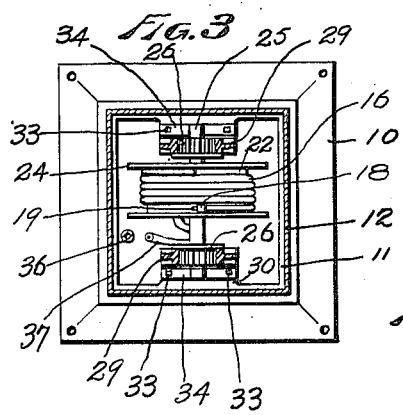
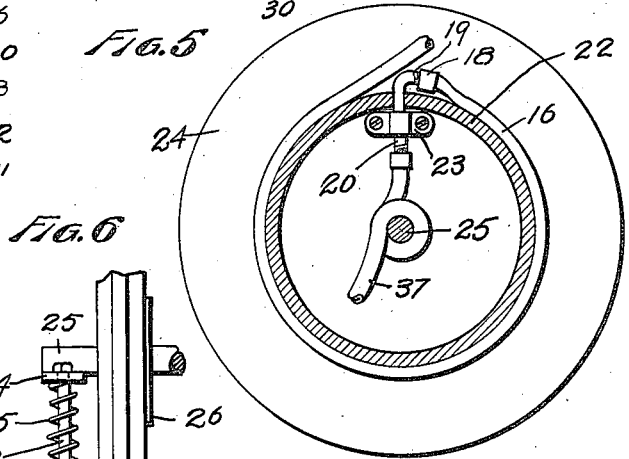
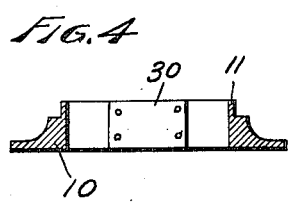
INVENTOR
WILLIAM DOLL
BY Edward E. Longan
ATTY.

Patented Sept. 25, 1923.

1,468,776

UNITED STATES PATENT OFFICE.

WILLIAM DOLL, OF ST. LOUIS, MISSOURI.

AIR-HOSE CABINET.

Application filed April 13, 1922. Serial No. 552,154.

*To all whom it may concern:*

Be it known that I, WILLIAM DOLL, a citizen of the United States, and resident of the city of St. Louis and State of Missouri, have invented certain new and useful Improvements in Air-Hose Cabinets, of which the following is a specification containing a full, clear, and exact description, reference being had to the accompanying drawings, forming a part hereof.

My invention relates to certain new and useful improvements in air hose cabinets, and has for its primary object a cabinet for air hose which are designed primarily for filling stations, and in which the air hose is normally housed and can be withdrawn therefrom for use, and which will be automatically drawn back into the housing.

In the drawings,

Fig. 1 is a front elevation of my device.

Fig. 2 is a side elevation with parts broken away and in section, showing the interior mechanism.

Fig. 3 is a cross section taken on the line 3—3 of Fig. 1.

Fig. 4 is a central cross section of the base.

Fig. 5 is an enlarged section of the hose reel, showing the manner of making the air connection.

Fig. 6 is an enlarged fragmental view, showing the bumper.

Fig. 7 is a vertical cross section of the reel.

Fig. 8 is a rear view of the hose guiding rollers.

Fig. 9 is a cross section of the same taken on the line 9—9 of Fig. 8.

In the construction of my device I employ a base 10. This base is preferably rectangular, but may be of any desired shape. The upper portion of the base is provided with a flange 11 to which is secured a housing or casing 12. The casing 12 is provided with an opening 13. On the inside of the casing is secured a bracket 14 which supports rollers 15. These rollers acting as a guide for the air holes 16 which passes through the opening 13. The air hose is provided on its projecting end with a valve 17 which is designed to fit over the valve stem of a pneumatic tire. The opposite end of the hose 16 is provided with a coupling 18 which is secured to the end 19 of a pipe 20. This pipe passes through the opening 21 formed in the reel 22. The pipe is held in position by means of a strap 23 which is secured to the web of the reel. This reel is preferably of cast iron and is provided with flanges 24, so that the hose 16 will be retained thereon. This reel is secured to a shaft 25, either by means of a key or similar fastening means. Secured to the shaft 25 are gears 26. These gears are mounted in a U-shaped frame 27,—one side of which is provided with gear teeth 28, so as to form a rack with which the teeth of the gears 26 mesh. The other side is smooth, as indicated at 29. The base 10 is provided on two opposite sides with pads or projections 30, to which the lower ends 31 of the U-shaped frame are secured. Before securing the U-shaped frames to the base, the reel 22 is placed in position. The bumpers each of which consists of an L-shaped strip 32 to which is secured bolts 33. These bolts carry a flat plate 34, and between the plate 34 and L-shaped plate or bracket 32 is interposed a coil spring 35. The bumpers are then placed in position, after which the U-shaped frames 27 are secured in place. Extending upward through the base and into the housing is an air supply pipe 36, to which is secured one end of a supply hose 37. The opposite end of this hose 37 is secured to the pipe 20. After these connections have been made, the reel 22 is raised to its uppermost position in the frames 27, and the air hose 16 is attached and given at least one turn around the reel. During this operation the hose 37 is wound around the shaft 25. The reel is now allowed to descend by its own gravity and wraps up the air hose with it. The free end of the hose 16 is then passed between the rollers 15 and allowed to project from the housing 12,—after which, the valve 17 is secured. The entire cabinet is designed to be mounted on a concrete base and secured by means of bolts 38.

I may if desired place a light 39 on the upper portion of the housing so as to attract attention.

The operation of my device is as follows:

After the parts have been all assembled and it is desired to use the air hose the same is grasped and pulled out in the desired length, or until limited by the upper portion of the U-shaped frames 27, this operation unwinds the hose 16 from the reel, but winds the air supply hose 37 around the shaft 25. After the tires have been filled, it is only necessary to let go of the free end of the air hose, and the weight of the reel will cause it to descend, and the meshing of the pinions or gears 26 with the rack 38 will impart a rotary motion thereto, rolling up the air hose 16, while at the same time the hose 37 is unrolled from the shaft.

When the reel reaches approximately its lowest point, the projecting ends of the shaft 25 strike the plates 34 and cause a compression of the springs 35. This absorbs the jar of the descending reel, and at the same time limits the downward movement.

Having fully described my invention, what I claim is:

1. An air hose cabinet comprising a base, a housing having an opening in one side secured to said base, U shaped frames having a rack formed on one side secured at their lower ends to opposite sides of said base, a reel, a shaft secured in said reel and projecting beyond the sides thereof, flanged pinions secured to said shaft near its ends and meshing with said racks, a spring bumper carried by each U frame and adapted to contact with said shaft at its ends for limiting the downward movement thereof, a pipe secured to said reel, a hose attached to one end of said pipe, said hose adapted to be wound on said reel and project through the opening in the housing, and a second hose attached to the pipe carried by the reel, said second hose being wound around the shaft in the direction opposite to the hose on the reel so that when the hose on the reel is pulled from the cabinet the reel is raised and the second hose wound up on the shaft, the lowering of the reel rewinding the hose thereon and unwinding the hose from the shaft.

2. The air hose cabinet of claim 1 in which the housing is provided with guide rollers adjacent the opening so as to permit free passage of the hose therethrough.

In testimony whereof, I have signed my name to this specification.

WILLIAM DOLL.